United States Patent
Traylor et al.

(10) Patent No.: US 10,637,762 B1
(45) Date of Patent: Apr. 28, 2020

(54) HYBRID RELIABILITY AND COST-BASED METHOD FOR RESOURCE ALLOCATIONS IN SOFTWARE DEFINED INFRASTRUCTURES

(71) Applicant: EMC IP Holding Company LLC, Hopkinton, MA (US)

(72) Inventors: Rachel L Traylor, San Jose, CA (US); Craig A Struble, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 206 days.

(21) Appl. No.: 15/791,775

(22) Filed: Oct. 24, 2017

(51) Int. Cl.
*G06F 15/173* (2006.01)
*H04L 12/26* (2006.01)
*H04L 29/08* (2006.01)
*G06F 9/50* (2006.01)

(52) U.S. Cl.
CPC .............. *H04L 43/10* (2013.01); *G06F 9/505* (2013.01); *H04L 43/026* (2013.01); *H04L 67/1006* (2013.01)

(58) Field of Classification Search
CPC ... H04L 43/10; H04L 43/026; H04L 67/1006; G06F 9/505

USPC .......................................................... 709/224
See application file for complete search history.

(56) References Cited

U.S. PATENT DOCUMENTS

| | | | | |
|---|---|---|---|---|
| 2013/0138816 A1* | 5/2013 | Kuo | ...................... | G06F 9/5011 709/226 |
| 2016/0036655 A1* | 2/2016 | Burton | ................ | H04L 41/5029 709/223 |
| 2016/0266962 A1* | 9/2016 | Rajasekharan | ..... | G06F 11/0793 |

* cited by examiner

*Primary Examiner* — Wing F Chan
*Assistant Examiner* — Joseph R Maniwang
(74) *Attorney, Agent, or Firm* — Staniford Tomita LLP

(57) ABSTRACT

Embodiments are directed to a method and system for allocating common resources for a user in a cloud computer network, by: monitoring system reliability and resource charges; estimating a reliability based on the monitored system reliability and simulating resource provisioning choices to measure an impact of resource provisioning on the estimated reliability; estimating a cost based on the monitored resource charges; and allocating network resources based the estimated cost and simulated resource provisioning choices.

12 Claims, 7 Drawing Sheets

HYBRID RELIABILITY AND COST-BASED METHOD FOR RESOURCE ALLOCATIONS IN SOFTWARE DEFINED INFRASTRUCTURES

TECHNICAL FIELD

Embodiments are generally directed to software define computing environments, and more specifically allocating resources using advanced reliability and cost-based models.

BACKGROUND

In software defined infrastructures, vendors such as cloud service providers, generally host users' applications and handle tasks including system maintenance, backup and resiliency planning. These platforms offer highly scalable resources that can be adjusted on-demand and are well-suited for workloads that are temporary or subject to change.

Cloud computing services are generally provided along the scale of Software as a Service (SaaS), platform as a Service (PaaS), and Infrastructure as a Service (IaaS). These software defined computing environments provide different levels of vendor support to user installations. IaaS provides virtualized computing resources over the Internet in which a third-party provider hosts hardware, software, servers, storage and other infrastructure components on behalf of its users; PaaS adds the operating system (OS), middleware, and runtime components to the vendor provided components; while SaaS adds applications and data to the vendor provided components, so that the user provides only customization parameters.

The allocation of resources in software defined infrastructures, such as the IaaS offerings by cloud providers, is a fundamental challenge. A common example is the automatic creation and destruction of virtual servers in response to changes in service request rates. In most circumstances, automatic scaling employs basic thresholding techniques so that resources are only allocated when a simple trigger condition is reached. For example, increasing the number of servers when overall system load reaches 80% for more than 30 seconds, or decreasing when the overall system load reaches 40% for more than 5 minutes. The thresholds are often defined empirically and fail to take into account models of IaaS (or PaaS) costs associated with server allocations.

To address the shortcomings of current approaches, what is needed are new methods based on reliability theory and that incorporate costs associated with provisioning software defined resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
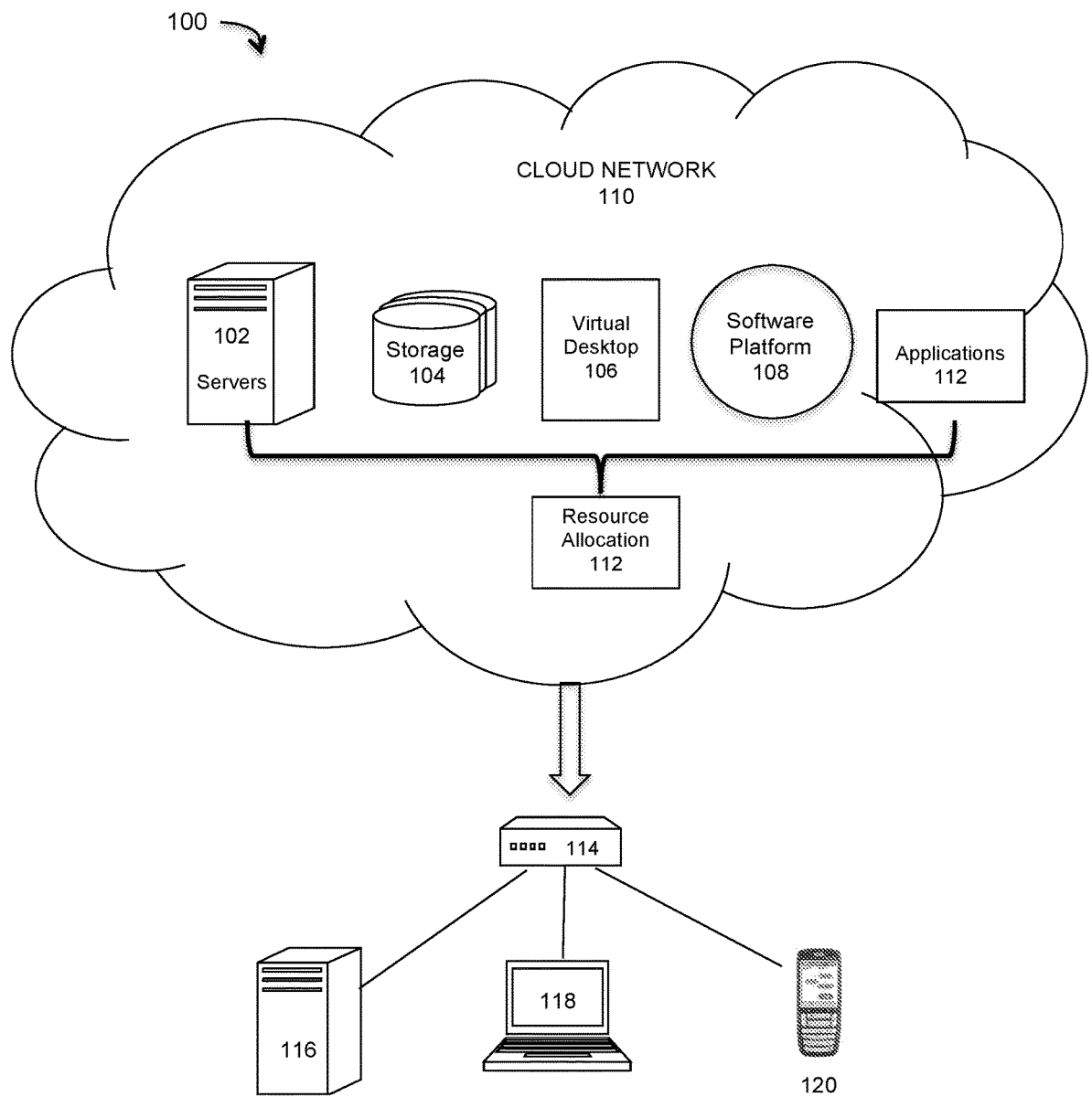
FIG. 1 illustrates a cloud computer network system that implements a reliability and cost-based resource allocation method, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Embodiments are directed to methods and systems of resource allocation based on reliability theory and that incorporate costs associated with provisioning software defined resources. Reliability models are used to decide when the system is at risk of instability or failure, and optimization algorithms are used to make cost effective choices that balance risk of failure with the provisioning of resources. Embodiments can be employed in enhanced IaaS or PaaS offerings, such as Pivotal Cloud Foundry, to reduce costs to customers while offering a value-added feature over open source Cloud Foundry offerings. An additional use would be in hybrid cloud offerings to have resource allocation software decide on the placement either on premise or in a hosted cloud environment based on reliability and cost needs. These are examples of applications of a resource allocation method, and embodiments are not so limited. Any computer network that has shared resources that may be allocated among a number of users may be appropriate for application of the described methods and systems.

FIG. 1 illustrates a cloud computer network system 100 that implements a reliability and cost-based resource allocation method, under some embodiments. In the example cloud computing environment 100 of FIG. 1 a number of users operating different devices, such as server or desktop computer 116, laptop/notebook computer 118 or mobile computing device (e.g., smartphone, tablet, etc.) 120 access the cloud network 110 through appropriate interface devices, such as router/switch 114 or other interface devices, such as gateway devices, Wifi modems, and so on. The user devices can access resources in the cloud through a cloud provider or vendor, who provisions resources for the user based on certain subscription or payment plans. The client computers illustrated in FIG. 1 are intended to be examples of certain types of clients and embodiments are not so limited. Any practical number and type of client devices are possible for system 100, depending on the scale and configuration of the network.

Depending on the level of support required (e.g., SaaS, IaaS, PaaS), the cloud resources available to the client devices include server resources 102, storage 104, networking resources, virtualization components 106, software platforms 108, and even applications 112 and data (in SaaS solutions). The cloud thus allows access to shared pools of configurable resources that can be rapidly provisioned with minimal management effort. This allows users and enterprises with various computing capabilities to store and process data in external computer resources (e.g., in a privately-owned cloud, or on a third-party server located in a data center), thus making data-accessing mechanisms more efficient and reliable, and without the need to expend up-front IT infrastructure costs. In typical pay-as-you-go subscription plans, a user's resource needs are typically provisioned dynamically by the vendor based entirely on their usage needs.

During provisioning, a service mediation device may translate the service and the corresponding parameters of the service to one or more services/parameters on the network elements involved using a provisioning logic algorithm. Server provisioning prepares a server with appropriate systems, data and software, and make it ready for network operation. Typical tasks when provisioning a server are to select a server from a pool of available servers, load the appropriate software (e.g., OS, drivers, middleware, applications), and appropriately customize and configure the system and change its parameters (e.g., such as address/gateway) to find associated network and storage resources. In cloud computing, servers may be provisioned via a web user interface or an application programming interface. The terms "user," "customer," and "client" may be used interchangeably to refer to a user of a client device (e.g., 116, 118, 120) in a system where a vendor or web service provider provides access to shared resources in the cloud 100 or other large-scale network.

As stated previously, present provisioning methods typically rely on simple pre-defined trigger conditions using threshold values, such as maximum/minimum system load per unit time, or maximum/minimum storage capacity reached. Under typical usage terms, users are allocated more resources when usage exceeds a maximum threshold, and are de-allocated resources when the minimum threshold value is reached. This allocation mechanism ostensibly balances resources among all users/subscribers in the systems. Such basic thresholding techniques are defined empirically and fail to take into account models of infrastructure costs associated with server allocations.

In an embodiment system 100 includes a resource allocation component 112 that allows for dynamic resource allocation for software defined infrastructures based on reliability models and cost considerations, rather than simple trigger conditions. Software-defined environments, such as those provided by cloud vendors (e.g. Amazon, Microsoft, Google, etc.) enable the rapid and flexible ability to provision resources to support system development and operations. During the lifecycle of system operations, resources such as virtual machines and containers are provisioned and decommissioned in response to varying traffic and system loads as well as other events. Fundamental challenges in this environment include: determining when to provision or decommission a resource; how many resources should be provisioned or decommissioned; estimating the costs associated with dynamic changes in the system; and placement of resources.

In an embodiment, these factors are addressed systematically in resource allocation component 112 using reliability theory and underlying queuing theory models. In this context, servers (e.g., containers and virtual machines) may be viewed as a queue, and therefore queuing theory is employed to create workload models. These models give rise to survivability functions and related hazard functions, which provide quantitative estimates of the chance of server failure. Certain mathematical foundations will first be used to illustrate how reliability with complex dependencies provide insights into the behavior of resources in software defined environments.

With respect to modeling complex server workloads, in basic queuing theory, workload arrivals are modeled by Poisson distributions, which imply a constant rate of arrival, where a Poisson distribution is the known discrete probability distribution that expresses the probability of a given number of events occurring in a fixed interval of time if these events occur with a known constant rate and independently of the last event time.

More complex arrival patterns can be modeled using other approaches; for example, in a particular stochastic reliability models for web servers under stress, customers or jobs arrive to the server via a non-homogenous Poisson process, which allows the arrival rate to vary over time. Each job brings a constant stress of $\eta>0$ to the server and adds this stress to the hazard function for the duration of its time in the system. The definition of stress is left to the application, but some examples are memory usage, CPU load, or IOPs (input/output operations). This model derives the survival function $S_Y(t)=P(Y>t)$ under the assumption of independent arrival times $\{T_i\}_{i=1}^n$ and independently and identically distributed service times $\{W_i\}_{i=1}^n \sim G(w)$. In an embodiment, this model has been generalized by allowing the workload stress brought by each job to be independently and identically distributed random variables $\{H_i\}_{i=1}^n \sim H$, where the random variable H may have either a discrete or continuous distribution. Thus, a very general survival function is produced that allows for a non-constant arrival rate, service times of any distribution $G(w)$, and a workload with any distribution.

In the context of a shared resource computing environment, the random stress model is applied to a "partitioned" server with K channels. Each channel is capable of performing a single task and has service time distribution $G_i(t)$, $i=1, \ldots K$. Customers still arrive via a non-homogenous Poisson process with intensity $\lambda(t)$, and upon arrival, select N channels based on the desired tasks that each channel performs. The selection is done sequentially, with the customer moving down the channel/task options and either selecting or rejecting it. Thus, channel selection is a Bernoulli random variable $\varepsilon_i$, $i=1, \ldots, K$ with probability of success p. For simplification, each customer adds a constant multiple $\eta$ of the number of channels selected as a stress factor to the server for the remainder of the customer's time in the system. That is, the stress added by each customer remains $\eta N$ until the completion of the last (slowest) task requested, regardless of the completion of other selected tasks, where the sample space for the random variable N is $\{1, 2, \ldots, K\}$.

Figure 2:
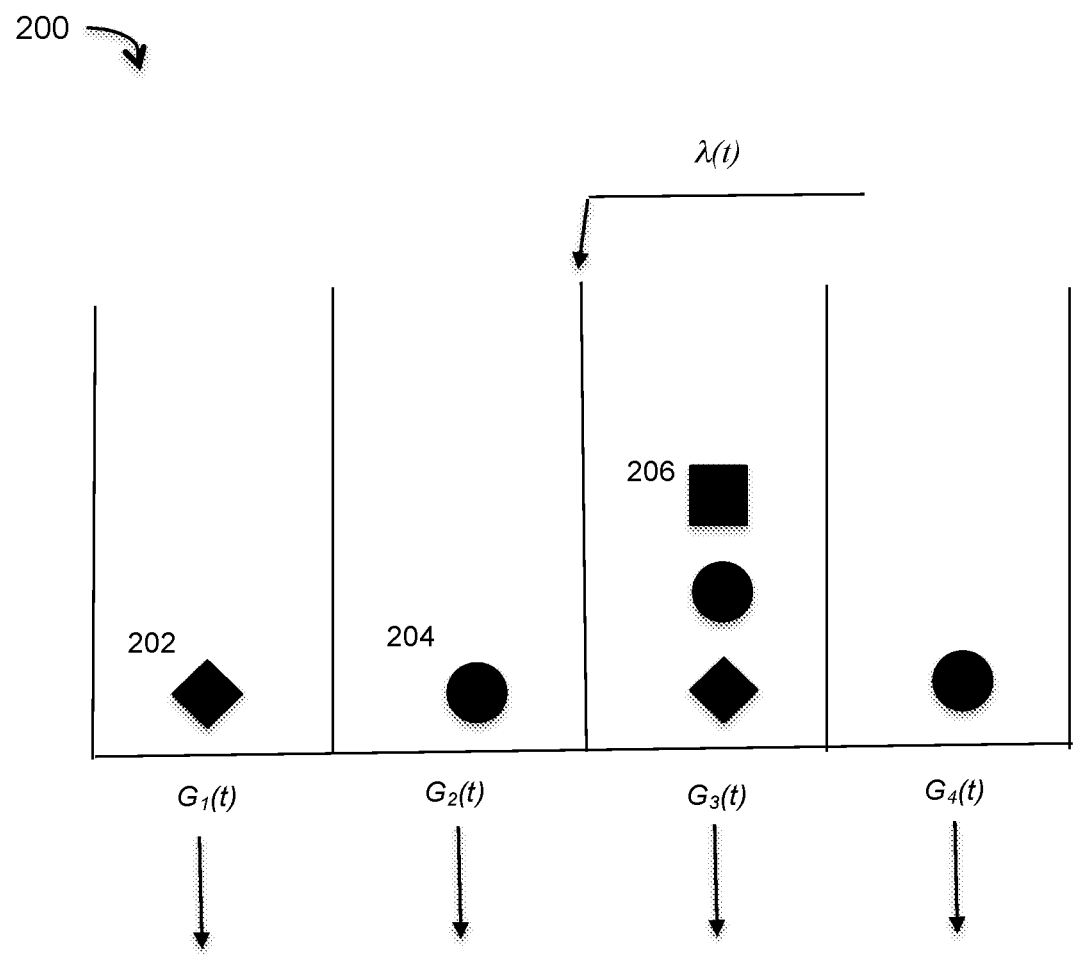
FIG. 2 illustrates an example of non-homogenous arrival times for jobs in a multi-channel server system, under an example embodiment.

FIG. 2 illustrates an example of non-homogeneous arrival times for jobs in a multi-channel server system, under some embodiments. Diagram 200 illustrates the case of a four-channel server with channels (1 to 4) to serve a number of customer jobs. In FIG. 2, the diamond shape 202 represents customer 1, the circular shape 204 represents customer 2, and the square shape represents customer 3. In this example, $\lambda(t)$ is the intensity of the non-homogeneous Poisson process governing arrivals. Customer 1 selects two tasks (channels 1 and 3), and thus the stress added is $2\eta$, where $\eta>0$. In diagram 200, $G_i(t)$ is the service time distribution of channel i. Let $W_i$ denote the service time for customer j at channel i. Then $G_i(t)$, and the service time for customer 1 is $\max_{ij}(W_{ji})$. The stress $2\eta$ remains part of the hazard function until both tasks are completed. Customer 2 selects three tasks (channels 2, 3, and 4), but in this case, channel 3 has not completed the requested task for customer 1. Thus, a queue can form in each channel, regardless of the queue length of the other channels. The stress that customer 2 adds to the system is $3\eta$ and remains until the final task selected is completed.

In general, there are K queues where the service times for each queue are all mutually independent and have a service time distribution governed by the channel. The service time distribution at the customer level under this model is therefore $\max_i G_i(t)$, where the maximum may be found by conventional statistical means.

The stress to the server brought by each customer is denoted by $H_j$. The model is thus a special case with $H_j=\eta N_j$, where $N_j$ is the random number of tasks selected by customer j. Since the selection of channels is a sequence of Bernoulli random variables $\{\varepsilon_{ij}\}_{ij=1}^{Nj}$, $N_j=\Sigma \varepsilon_{ij}$, and $N_j \sim N$, where N is binomially distributed.

In an embodiment, resource allocation component 112 employs decision making using certain reliability theory models of reliability as derived above. These models give rise to a survival function $S(t)$, which is the probability of the server (or resource) surviving past time t. Its complement $F(t)=1-S(t)$ is the probability the server will fail before time t. Given the cost of failure $C_f$ and the "spin up" or "addition" cost $C_s$, the system may determine an acceptable risk level for failure. This risk level may be measured as a probability of failure $p_F$ or a failure rate $\lambda$, to give two examples. Below the acceptable failure risk level, no new resources are added. After the acceptable risk level has been passed, new resources are added until the risk level has decreased back to the acceptable level.

The threshold value to trigger reallocation in process 112 is thus determined by the survival function or another equivalent form, rather than any preset value or "rule of thumb." These survival functions change with the number of additional resources spun up, so the decision process in component 112 is dynamic. In addition, the parameters for the survival function can be estimated and updated, providing a truly dynamic methodology of resource allocation.

The survival function described above is only one possible way to use survival analysis to make decisions, and embodiments are not so limited. Other metrics in reliability theory include the hazard function $h(t)$, the failure probability $F(t)$, the cumulative hazard function $H(t)$, the mean residual life $L(t)$, the probability density function $f(t)$, the reliability function $R(t)$, and the mean time to failure (MTTF), to name a few examples. Every one of these metrics is equivalent, through certain mathematical relationships, to the survival function, because they can all be derived from the survival function $S(t)$. Table 1 below summarizes the certain other metrics listed above in terms of $S(t)$. In an embodiment, any of these metrics can be used to make a decision, because they are readily obtained from the survival function.

TABLE 1

| Metric | In terms of S(t) |
| --- | --- |
| h(t) | $-S'(t)/S(t)$ |
| H(t) | $-\ln(S(t))$ |
| f(t) | $-S'(t)$ |
| F(t) | $1-S(t)$ |
| L(t) | $1/S(t) \int -tS'(t)dt$ |
| R(t) | $-tS'(t)$ |
| MTTF | $\int -t(S'(t)dt$ |

In environments where resource pools are managed programmatically, such as public clouds, scaling and load balancing are often accomplished through simple empirical rules. An example of such a rule is: "add a resource when the resource load reaches 80%," or some other appropriate level. As stated previously, this simplistic determination of the threshold value is typically provided by a rule of thumb and may not be adapted over time due to resource performance or costs associated with adding or removing resources.

In an embodiment, a resource allocation method improves upon this methodology by making resource allocation decisions in a software-defined resource environment using: (1) models of reliability to provide estimates of failure rates; (2) models of cost to provide estimates of the cost to provision and utilize resources as well as costs associated with resource failures; and (3) processes to monitor and adapt reliability and cost models over time based on actual system behaviors.

Figure 3:
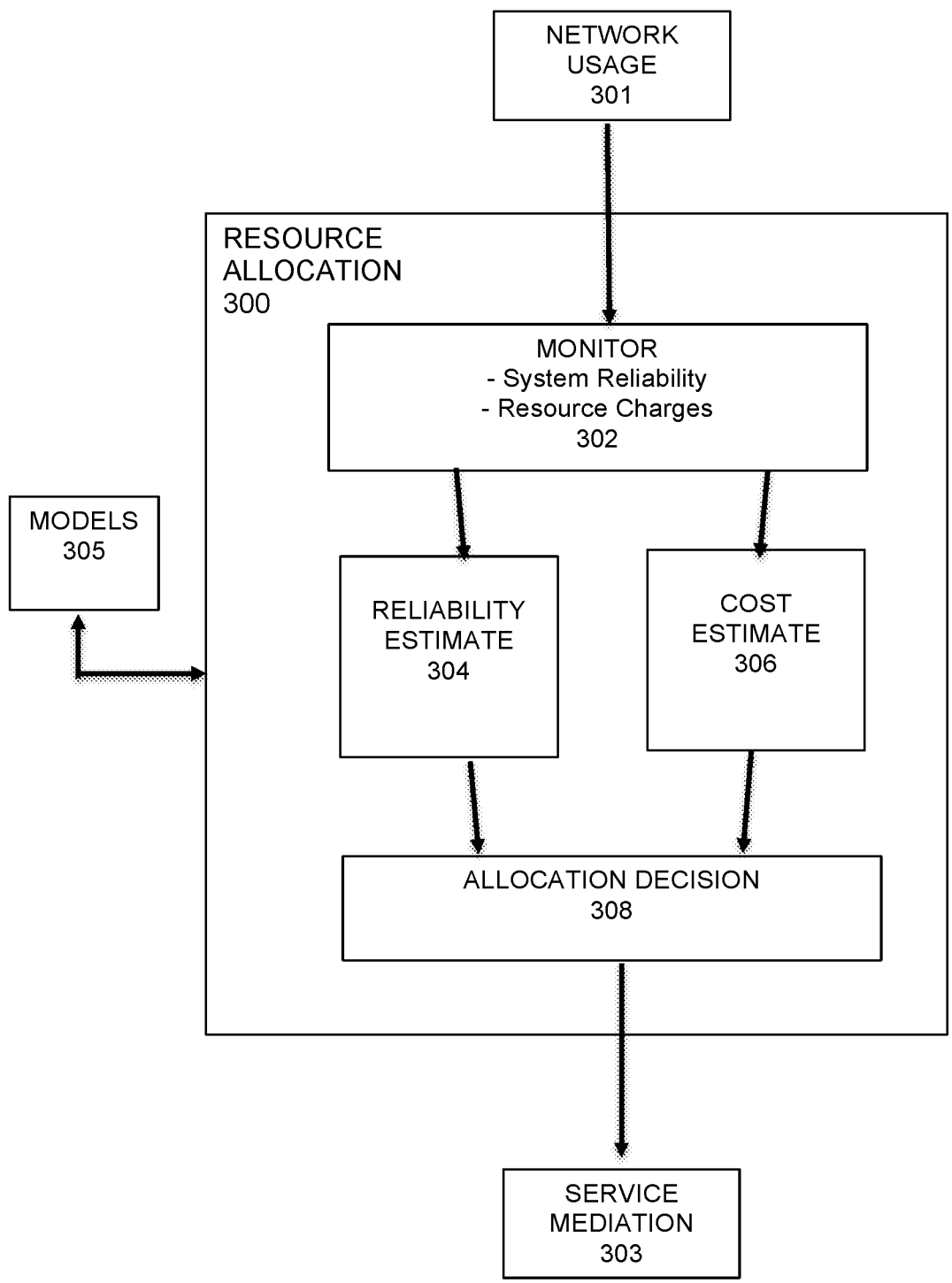
FIG. 3 is a block diagram that illustrates processing components of a resource allocation module or circuit, under some embodiments.

In an embodiment, the resource allocation function 112 may be implemented as a software process or program executed in a server component in cloud network 110, such as a server maintained by a web service provider. Alternatively, it may be implemented as a hardware component, circuit, or programmable device configured to perform the functions of the resource allocation process described herein. FIG. 3 is a block diagram that illustrates processing components of a resource allocation module or circuit, under some embodiments. As shown in FIG. 3, resource allocation component 300 receives network usage statistics or measurements 301 from the client device and/or cloud service provider. This usage data is monitored in the allocation component by a monitor component 302. The monitor 302 monitors both system reliability and resource charges. The usage measurements are processed in reliability and cost estimate components 304 and 306, that may each utilize internal or externally provided models 305. The models themselves may be updated through the operation of allocation component 300. The reliability measures and cost estimate data is then input to an allocation decision component that executes an allocation algorithm to determine the appropriate allocation or deallocation of resources for the client based on minimum costs and maximum reliability.

In an embodiment, the output of decision component 308 may be sent to an external service mediation device 303 translates the allocation decisions to one or more services/parameters on the network elements. This may be an external functional component that allocates or deallocates containers, spawns VMs, prepares a server with appropriate systems, data and software, and make it ready for the client, selecting or deselecting a server from a pool of available servers, or other appropriate allocations of associated network and storage resources.

It should be noted that any or all of the components of FIG. 3 may be implemented as software processes, hardware components, or a combination hardware and software, as can be appreciated by those of ordinary skill in the art.

Figure 4:
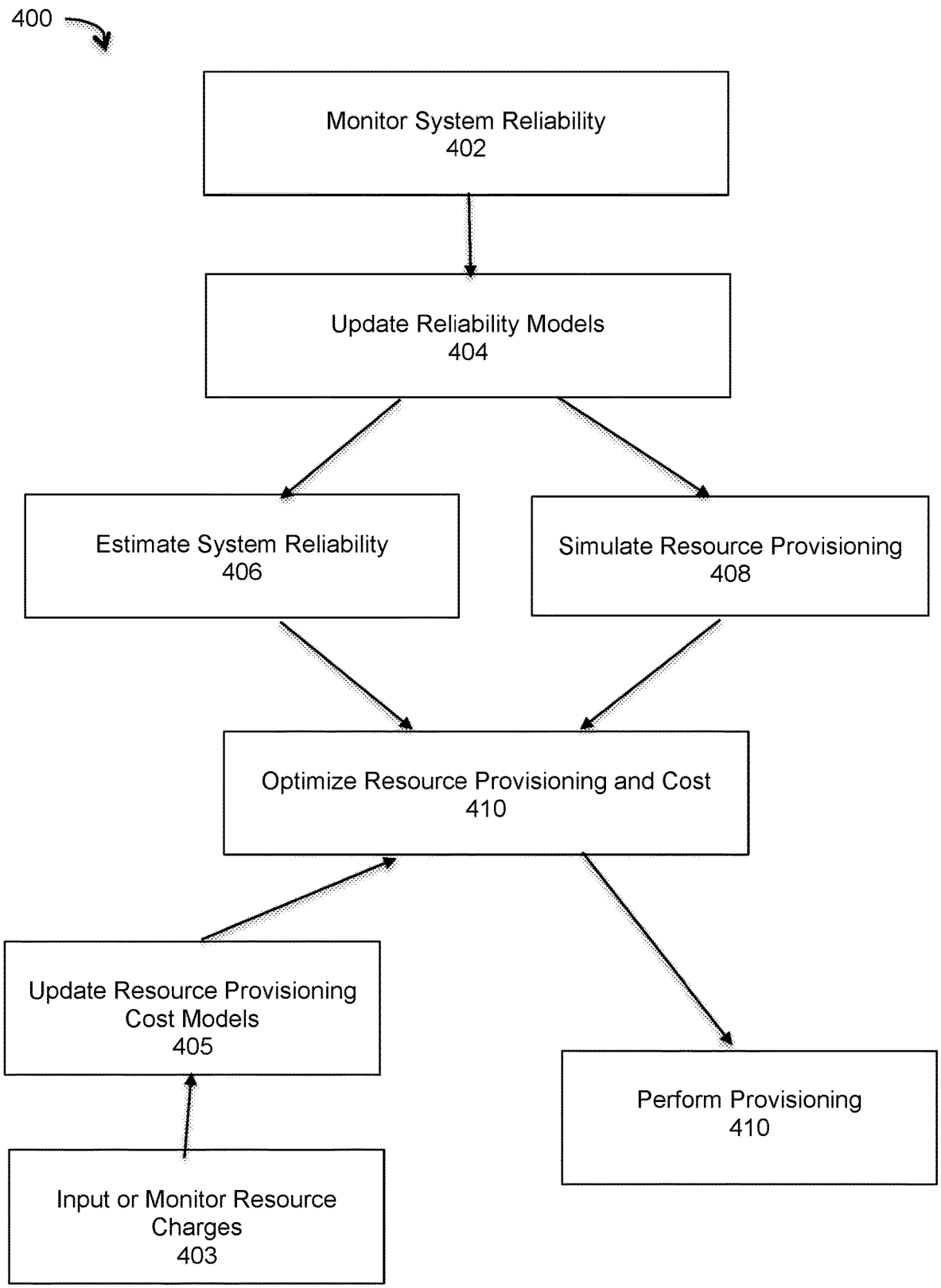
FIG. 4 illustrates the high-level process diagram of a resource allocation method, under some embodiments

FIG. 4 illustrates the high-level process diagram of a resource allocation method, under some embodiments. The process 400 starts by monitoring system reliability to measure current system behavior and reliability, step 402. Notable events such as resource failures, changes in memory levels, number of clients in processing queues, etc., are recorded. A second starting point is to input or monitor resource charges to measure system costs for resource provisioning and ongoing use, step 403. Once data on reliability and costs are collected, the process updates the reliability models, step 404 and updates the resource provisioning cost models, step 405 to adapt to ongoing system changes. The reliability models can then be used to estimate system reliability of the current system, step 406, and to simulate resource provisioning choices to explore how resource provisioning changes system reliability, step 408. The current estimate of system reliability, a collection of resource provisioning choices and associated reliability, and cost models for resource provisioning scenarios are inputs into a process to optimize resource provisioning and cost, 410. Note that costs include the costs of having the system fail to provide service, often resulting in lower revenue or an estimate of cost impact due to customer dissatisfaction. Finally, the choices made by the optimizer are used to perform provisioning, step 410.

In an embodiment, the process 400 is cyclical and iterative, and starts over again on a defined time period. The periodicity of the monitoring period and updates to the models can be set by the user or system administrator to any appropriate time period, such as hourly, daily, weekly, and so on. Alternatively, it may be set by a system default to a preset value. Similarly, the granularity or measurement standards for the cost and reliability estimates may be set to any appropriate amount, such as a minimum percentage change (e.g., 1%, 5%, or 10%, etc.) from an established baseline value for the appropriate unit of measurement, such as a percentage change of cost in US dollars, or a percentage change in actual failures or measured MTTF numbers.

Embodiments include the use of statistical reliability modeling to decide when resources should be added to a resource pool, and the use of statistical reliability modeling to decide when resources should be removed from a resource pool. The real-time adaptation of statistical reliability modeling is based on monitoring the performance of resources in the resource pool. Combining the reliability predictions from statistical reliability modeling with resource costs is used to decide when to add resources to a resource pool. The process 400 further features combining the reliability predictions from statistical reliability modeling with resource costs to decide when to remove resources to a resource pool. Adding resources to the pool has a spin up cost associated with the action, and system failure also has an associated cost. These costs can be managed dynamically using the survival function or other associated functions described below.

Example Use Cases

Embodiments of the resource allocation method can be used in a variety of example applications. One such application is to help make scale-out decisions. Many applications now use the ability to scale out, i.e., generate additional instances of the application in order to handle additional workload. The decision to scale out carries a cost in terms of time to spin up and in terms of storage. Many times, the decision to scale out or back is based on a threshold CPU usage value. Using the survival function for a sequence of parallel channels, the process can determine the best time to scale-out while optimizing for cost.

For example, suppose a server begins service with four instances of an application. The server traffic and job service times are estimated and modeled and the corresponding survival function for various numbers of instances is given in FIG. 5. Given the cost of failure $C_f$, it is determined that the acceptable threshold for failure is 70%. That is, suppose that once the survival probability $S(t)<30\%$, then a new VM should be initiated. When a new VM is initiated, suppose the survival function shifts in the manner shown in FIG. 5. Then we assume the server upon addition of a VM is "as good as new" and the time t restarts at 0.

Figure 5:
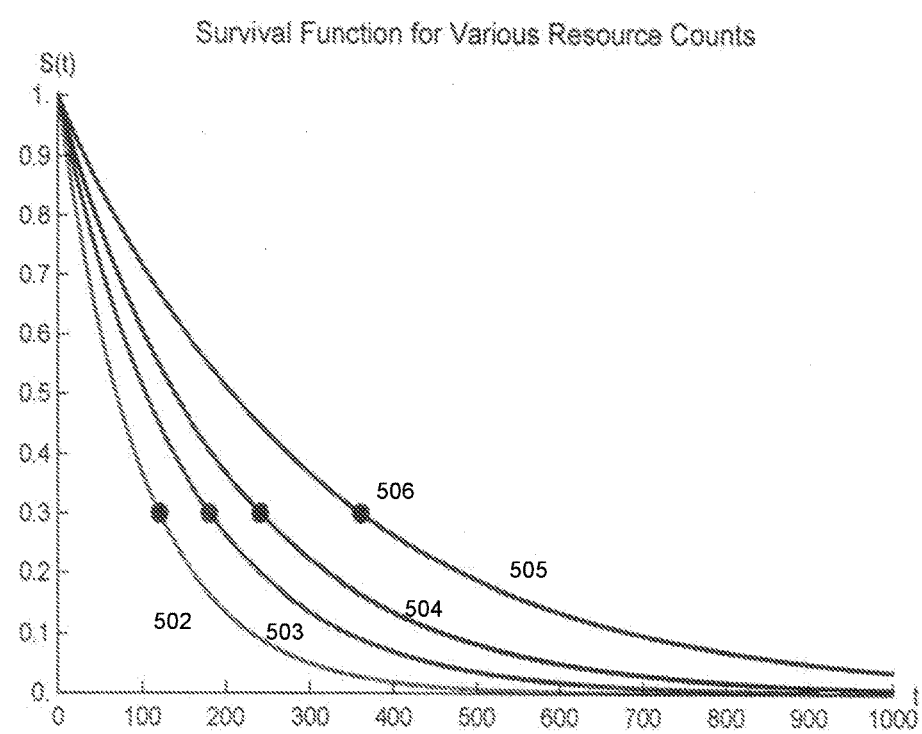
FIG. 5 illustrates an example survival function for various resource amounts for a resource allocation process under some embodiments.

FIG. 5 illustrates an example survival function for various resource amounts, K, for a resource allocation process under some embodiments. FIG. 5 illustrates different curves plotted as a function of S(t) versus time for different example K values, where curve 502 corresponds to K=4, curve 503 corresponds to K=5, curve 504 corresponds to K=6, and curve 505 corresponds to K=7. In diagram 500, the points 506 on each curve represent the amount of time before the cost-determined critical risk value is reached.

There are several steps to consider in the example of FIG. 5. First, initially four servers are in use; then, the point in time $t_0$ at which one should take action to spin up a new VM is given by the point 502 in FIG. 5. Second, the decision of how many new VMs to initiate is determined by the initiation cost $C_s$. Suppose $C_s$=$50,000/VM/year. In theory, one would add infinitely many more VMs to increase the reliability to near perfect, but the budgetary considerations restrict the amount to be spent. The desire is to find the smallest number K such that the risk is mitigated and the expected number of failures is at an acceptable level. Third, the cost of failure is given by $C_f$=$100,000. Suppose the business requires that the expected cost of failure must be kept under $200,000/year. The expected lifetime of the server is obtained by $E[Y]=\int S(t)dt$. The expected lifetimes, number of failures, and cost of failure for the various K in FIG. 5 are given in Table 2 below.

TABLE 2

| K | 4 | 5 | 6 | 7 |
|---|---|---|---|---|
| Expected Lifetime (days) | 100 | 150 | 200 | 300 |
| Expected Number of Failures per Year | 3.65 | 2.43 | 1.825 | 1.217 |
| Expected Cost of Failure per Year | 365,000 | 243,000 | 182,500 | 121,700 |

As can be seen from the cost of failure analysis, the system must spin up at least one more instance when the probability of server failure exceeds 70%. However, the more VMs that are initiated, the lower is the expected cost of failure. Thus, it is noted that $C_s$=$50,000/year, and that spinning up three more VMs costs $150,000/year, which puts the cost of additional VMs beyond the cost of failure. Therefore, it is unwise to spin up more than six VMs. and thus, the system must add a minimum of one and a maximum of two VMs.

The above example is a simplified illustration of how a reliability function is used to make a decision using embodiments of a resource allocation process under some embodiments. In practice, these costs and acceptable risk levels are dynamic, and take into account the traffic pattern to the server in order to decommission VMs when necessary.

Figure 6:
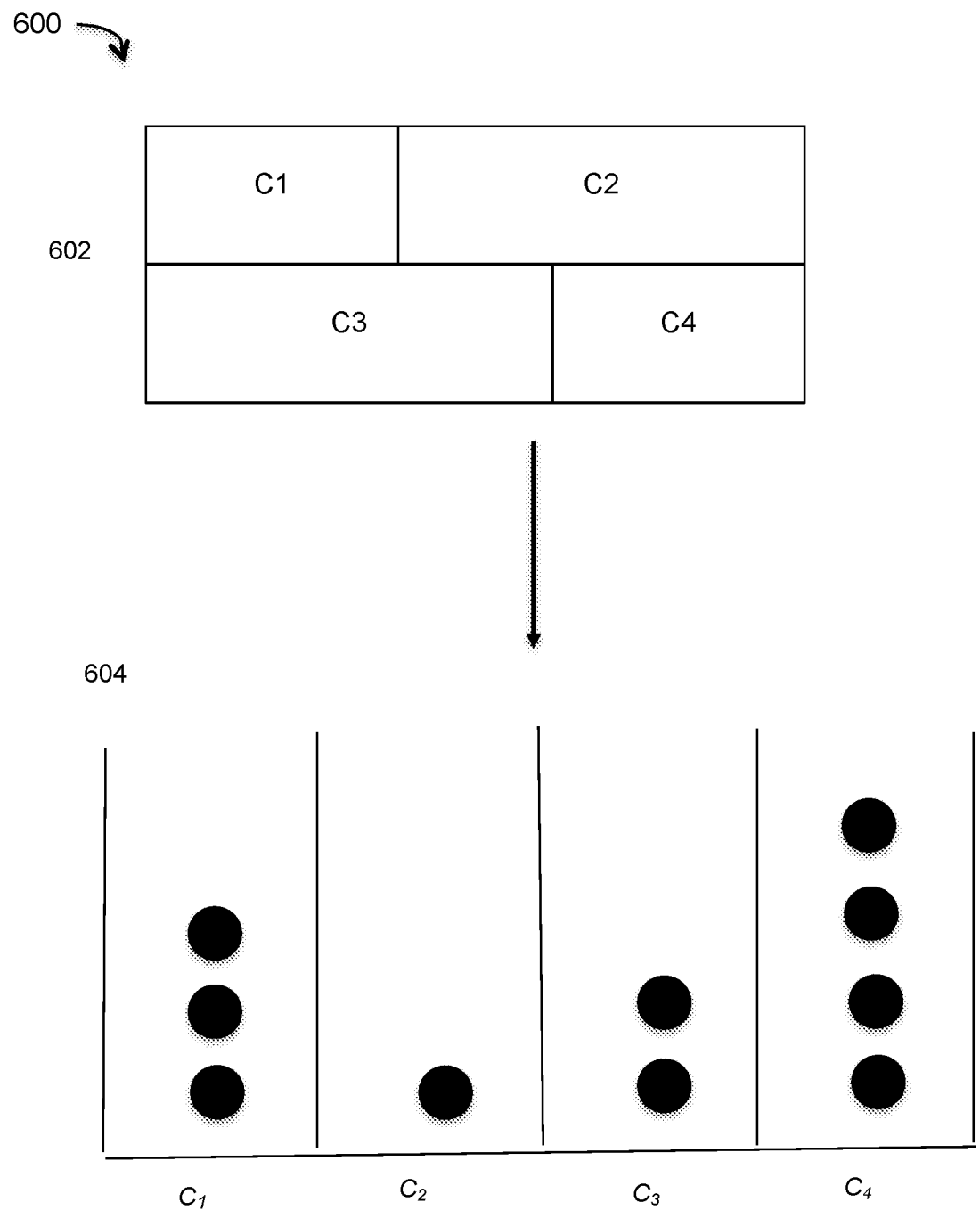
FIG. 6 illustrates an example of containers as a channel representation under an example embodiment.

Another example is that of container allocation. In general, a container is an application with dependencies, libraries, and configuration files bundled into a single package that can be moved from one computing environment to another. A data container shares OS resources with other containers, but when accessing a container, it behaves as if it owns the entire operating system. In this example, a server may be used for container computing, and a frequent dilemma is the choice between allocating space for another container on the same server, or placing it in a new server. FIG. 6 illustrates an example of containers as a channel representation under an example embodiment. In diagram 600, four containers 602 denoted C1, C2, C3, and C4 are represented as channels 604, with example jobs distributed among the containers.

A customer that utilizes the server may select tasks for any number of containers to perform, and each selection imparts stress on the server resources, which may be measured in memory usage or CPU load, as examples. To make the decision, a reliability model of the server with an additional container, represented as a new channel with stress estimated using historical monitoring data, can be compared with a reliability model including a new server. The costs associated with including a new server and the reliability can then be compared with those of adding the new container on the existing server to make the resource provisioning decision.

In general, network 110 of FIG. 1, may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent part of a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

Some embodiments of the invention involve very large-scale wide area networks (WAN), metropolitan area networks (MAN), or cloud based network systems, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although some specific flows are presented in flowchart or flow diagram form, it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

Figure 7:
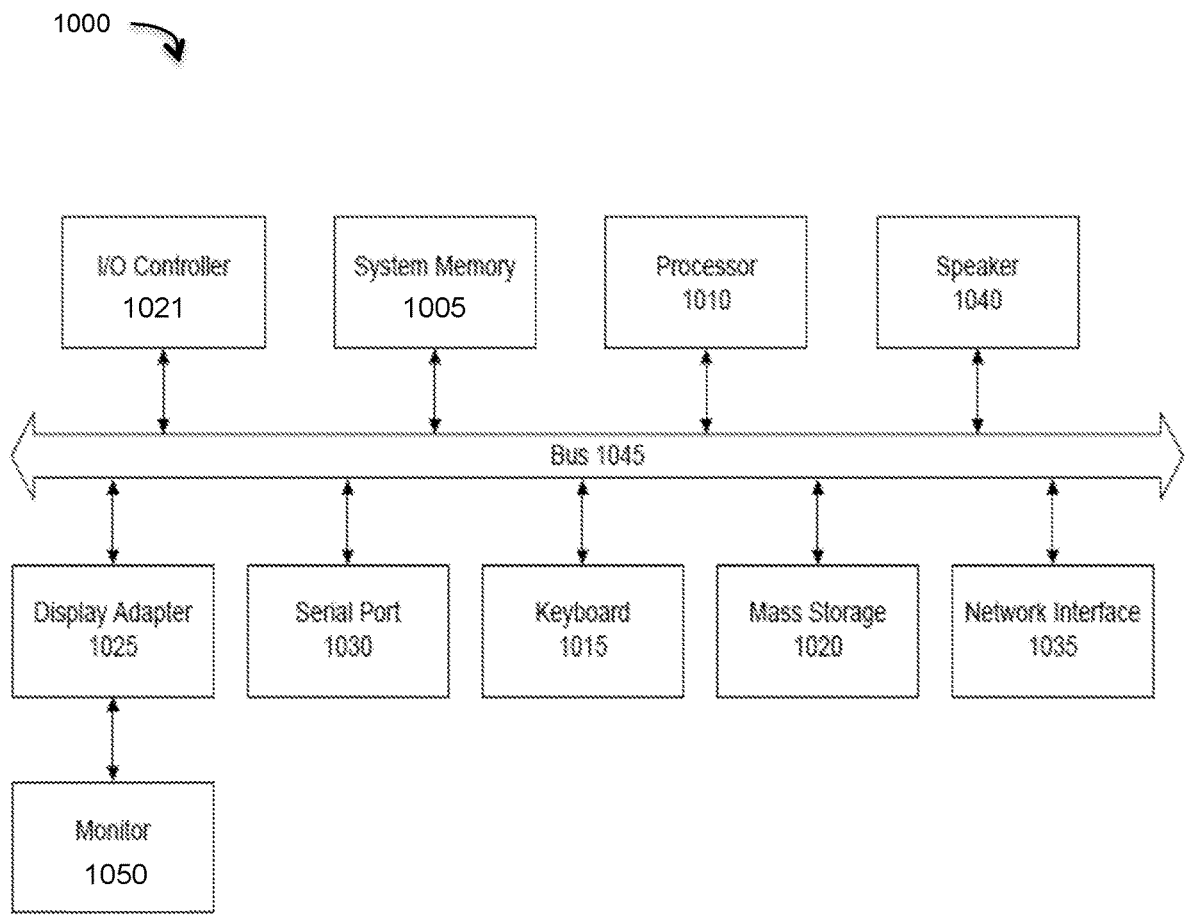
FIG. 7 shows a system block diagram of a computer system used to execute one or more software components of the cloud network resource allocation method and system described herein.

The network environment of FIG. 1 may comprise any number of individual client-server networks coupled over the Internet or similar large-scale network or portion thereof. Each server or client device in the network comprises a computing device capable of executing software code to perform the processing steps described herein. FIG. 7 shows a system block diagram of a computer system used to execute one or more software components of the present system described herein. The computer system 1000 includes a monitor 1050, keyboard 1015, and mass storage devices 1020. Computer system 1000 further includes subsystems such as central processor 1010, system memory 1005, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of allocating common resources for a user in a cloud computer network, comprising:
    monitoring system reliability and resource charges in a monitoring component coupled to a client computer of the user and the resources;
    first estimating a reliability based on the monitored system reliability and simulating resource provisioning choices to measure an impact of resource provisioning on the estimated reliability;
    second estimating a cost based on the monitored resource charges;
    allocating, in an allocation component managing the common resources, network resources based on the estimated cost and simulated resource provisioning choices;
    maintaining a system reliability model to perform the first estimating and that is used to forecast when the system is at risk of instability or failure based on a change of one or more reliability measures, and wherein the reliability model utilizes a survival function based on workload stress introduced by each job of a plurality of jobs, wherein workload stress comprises a number of independently and identically distributed random variables that have either a discrete or continuous distribution; and
    updating the system reliability model on a first periodic basis to adapt the reliability model to ongoing system changes.

2. The method of claim 1 wherein the common resources comprise at least one of: server resources, virtual machines, data containers, storage capacity, network interface resources.

3. The method of claim 1 further comprising:
    maintaining a cost model to perform the second estimating; and
    updating the cost model on a second periodic basis to adapt the cost model to the ongoing system changes.

4. The method of claim 3 wherein the user comprises a networked client sharing the common resources with a plurality of other clients through one or more processing queues.

5. The method of claim 4 wherein the system changes comprise at least one of: resource failures, changes in memory levels, and number of clients in processing queues.

6. The method of claim 3 wherein the costs comprise one of: a cost in revenue of the system failing to provide a service, and an estimated cost impact due to user dissatisfaction.

7. The method of claim 1 wherein the survival function allows for a nonconstant job arrival rate, any distribution of job service times, and any distribution of workload.

8. The method of claim 7 wherein the survival function comprises an alternative metric comprising one of: a hazard function, a failure probability, a cumulative hazard function, a mean residual life, a probability density function, a reliability function, and a mean time between failures measure.

9. The method of claim 1 wherein the survival function comprises a probability of a resource surviving past a given time, the method further comprising:
   measuring a remedial cost of failure of the resource or a cost of correction to remedy non-survival of the resource; and
   defining an acceptable risk of failure based on the probability and the remedial cost.

10. A system for allocating common resources for a user in a computer network, the common resources comprising at least one of: server resources, virtual machines, data containers, storage capacity, network interface resources, and the system comprising:
   a non-transitory computer-readable medium containing computer-readable instructions, that when executed by a computer cause the computer to perform steps comprising:
   monitoring system reliability and resource charges;
   first estimating a reliability based on the monitored system reliability and simulating resource provisioning choices to measure an impact of resource provisioning on the estimated reliability, and second estimating a cost based on the monitored resource charges;
   managing the common resources, and allocating the network resources based on the estimated cost and simulated resource provisioning choices;
   maintaining a system reliability model to perform the first estimating, wherein the system reliability model is used to forecast when the system is at risk of instability or failure based on a change of one or more reliability measures, and utilizes a survival function based on workload stress introduced by each job of a plurality of jobs, wherein workload stress comprises a number of independently and identically distributed random variables that have either a discrete or continuous distribution;
   updating the system reliability model on a first periodic basis to adapt the system reliability model to ongoing system changes;
   maintaining a cost model to perform the second estimating; and
   updating the cost model on a second periodic basis to adapt the cost model to the ongoing system changes.

11. The system of claim 10 wherein the user comprises a networked client sharing the common resources with a plurality of other clients through one or more processing queues, and wherein the ongoing system changes comprise at least one of: resource failures, changes in memory levels, and a number of clients in processing queues.

12. The system of claim 10 wherein the survival function comprises a probability of a resource surviving past a given time, and the steps further comprising measuring a remedial cost of failure of the resource or a cost of correction to remedy non-survival of the resource, and defining an acceptable risk of failure based on the probability and the remedial cost, wherein the costs comprise one of: a cost in revenue of the system failing to provide a service, and an estimated cost impact due to user dissatisfaction.

* * * * *